(12) United States Patent
Sanchez (10) Patent No.: US 9,942,625 B2
(45) Date of Patent: Apr. 10, 2018

(54) SYSTEM AND METHOD FOR STORING ONE OR MORE REMOVABLE SENSOR MODULES AT AN ELECTRONIC DEVICE (71) Applicant: Futurewei Technologies Inc., Plano, TX (US)

(72) Inventor: Jorge Fabrega Sanchez, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 712 days.

(21) Appl. No.: 14/145,549

(22) Filed: Dec. 31, 2013

(65) Prior Publication Data

US 2015/0189405 A1 Jul. 2, 2015

(51) Int. Cl.
*H04Q 9/00* (2006.01)

(52) U.S. Cl.
CPC .......... *H04Q 9/00* (2013.01); *H04Q 2209/40* (2013.01); *H04Q 2209/88* (2013.01)

(58) Field of Classification Search
CPC ..................................................... H04Q 9/00
USPC ........................................ 340/870.07, 870.01
See application file for complete search history.

(56) References Cited

U.S. PATENT DOCUMENTS

| | | | |
|---|---|---|---|
| 2004/0185919 A1* | 9/2004 | Yoo ...................... | H04M 1/0258 455/575.1 |
| 2007/0016381 A1* | 1/2007 | Kamath ............. | A61B 5/14532 702/19 |
| 2010/0013440 A1* | 1/2010 | Liao ..................... | H01M 10/443 320/152 |
| 2010/0097889 A1* | 4/2010 | Golparian ................ | G01V 1/22 367/77 |
| 2011/0001484 A1* | 1/2011 | Stits ...................... | H01M 10/00 324/426 |

* cited by examiner

*Primary Examiner* — Amine Benlagsir
(74) *Attorney, Agent, or Firm* — Schwegman Lundberg & Woessner, P.A.

(57) ABSTRACT

Various disclosed embodiments include methods and systems for providing sensor functionality to a wireless electronic device. The wireless electronic device comprises a sensor module disposed within and removably coupled to the wireless electronic device. The sensor module includes a sensor module electrical interface. The wireless electronic device includes a first interface configured to receive the sensor module, and a second interface disposed within the wireless electronic device configured to electrically connect to the sensor module electrical interface when the sensor module is connected to the wireless electronic device.

29 Claims, 4 Drawing Sheets

SYSTEM AND METHOD FOR STORING ONE OR MORE REMOVABLE SENSOR MODULES AT AN ELECTRONIC DEVICE

TECHNICAL FIELD

The present disclosure relates generally to sensor devices, and more particularly to a system for storing one or more removable sensor modules within an electronic device.

BACKGROUND

The use of sensors to monitor many parameters in our daily lives has been increasing recently. Mobile electronic devices such as smartphones have a number of on-board sensors such as accelerometers, gyroscopes, pressure sensors, temperature sensors, etc. For some applications (e.g., running, swimming, object tracking) it may not be practical to use the on-board sensors. In other instances, the mobile electronic device may not have the needed sensors built in (e.g., heart rate monitor).

Health and wellness monitoring wearable devices have been introduced in the last few years to monitor physical activities. Theses device use motion sensors such as accelerometers and/or biometric sensors such as heart rate sensors to monitor a variety of parameters such as number of steps taken, distance traveled, calories burned, etc. In addition, tracking devices have been introduced in the last few years to track and find objects such as computers, keys, etc. Some of these devices are designed to be worn or used substantially all the time, while others may be designed to be used or a user may prefer to use them for specific activities only.

Users of the aforementioned devices need to keep track of the sensor devices when not in use, and ensure the sensor devices are readily charged with power for next time use.

SUMMARY

According to one embodiment, there is provided a wireless electronic device. The wireless electronic device comprises a sensor module disposed within and removably coupled to the wireless electronic device. The sensor module includes a sensor module interface. The wireless electronic device includes a first interface configured to receive the sensor module, and a second interface disposed within the wireless electronic device configured to connect to the sensor module interface when the sensor module is connected to the wireless electronic device.

In another embodiment, there is provided a wireless electronic device configured to provide sensor functionality. The wireless electronic device comprises a first interface configured to receive a removably coupled sensor module. The wireless electronic device comprises a second interface disposed within the wireless electronic device and configured for connection to a corresponding interface on the sensor module when the sensor module is connected to the wireless electronic device.

In another embodiment, there is provided a method of storing one or more removable sensor modules at an electronic device. The method comprises, at the electronic device, receiving a sensor module configured to be removably coupled to the electronic device via a first interface of the electronic device, the sensor module including a sensor module interface. The method comprises connecting the sensor module to the electronic device via the sensor module interface and a corresponding second interface of the electronic device. The second interface is disposed within the electronic device.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
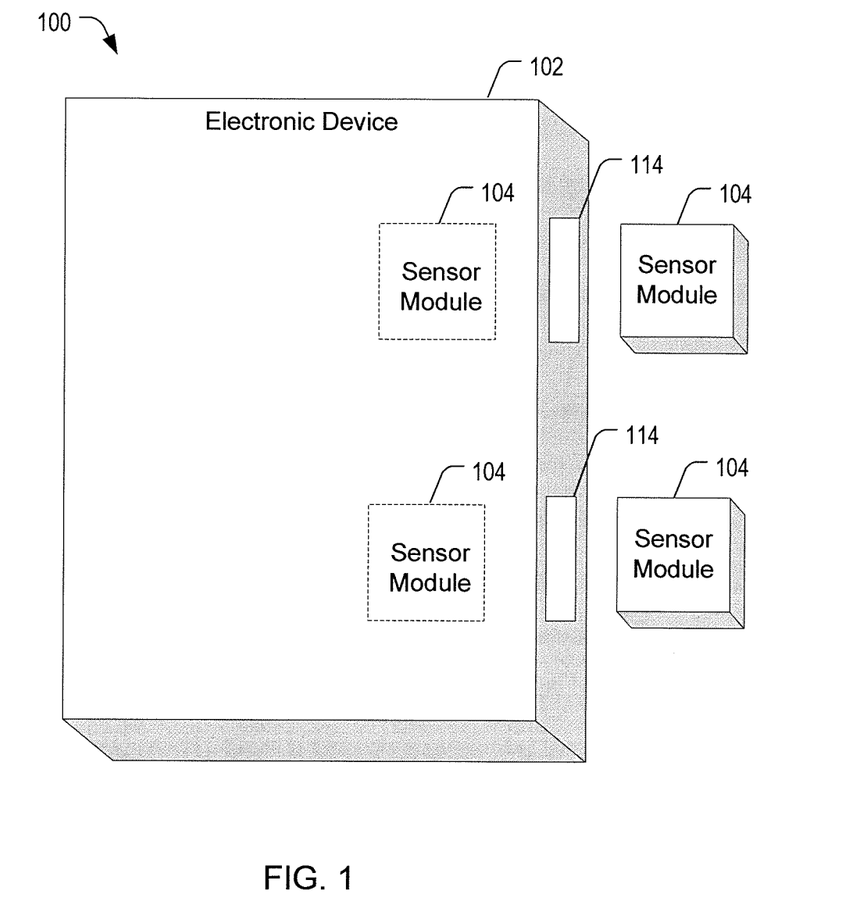
FIG. 1 illustrates a system for storing one or more removable sensor modules at an electronic device according to disclosed embodiments.

FIG. 1 is a diagram illustrating a system 100 configured to store one or more removable sensor modules at an electronic device. The system 100 includes an electronic device 102 (e.g., a docking device) and one or more sensor modules 104.

The electronic device 102 may be, for example, a portable wireless electronic device, such as a cellular telephone, smartphone, a media player with wireless communications capabilities, a handheld computer (also sometimes called a personal digital assistant), a remote controller, a global positioning system (GPS) device, a tablet computer, or a handheld gaming device.

The electronic device 102 includes multiple interfaces 114 configured to receive corresponding multiple sensor modules 104. The interfaces 114 may include a slot or receptacle configured to receive the sensor modules 104 such that the received sensor module 104 is at least partially disposed or housed within a housing of the electronic device 102. In other embodiments, the sensor module 104 may be completely or substantially encompassed within the device 102. It will be understood that the sensor module 104 is inserted into or removed from the electronic device 102 via the interface 114 enabling the sensor module 104 to be removably coupled to the electronic device 102.

The interface 114 facilitates data transfer (wired or wirelessly) between a sensor module 104 and the electronic device 102 when the sensor module is inserted within the interface 114. For example, data stored in the sensor module 104 may be transmitted to and received (e.g., accessed) by the electronic device 102, while data stored in the electronic device 102 may be transmitted to and received (e.g., accessed) by the sensor module 104.

The interface 114 may also facilitate the ability of the electronic device 102 to reprogram the sensor module 104 to change the functionality or operating characteristics of the sensor module 104. For example, the electronic device 102 may be configured to reprogram the rate at which data is acquired by the sensor module 104. As another example, the electronic device 102 may be configured to reprogram a sensor module 104 that has multiple on-board sensors to use only one or some of the on-board sensors available. Alternatively, the sensor module 104 may be "reprogrammed" by the electronic device 102 via a wireless link if a user removes/detaches the sensor module 104 from the electronic device 102 and attaches or couples the sensor modules 104 to a wearable device or another device or object to be sensed.

The interface 114 may also facilitate power transfer from a power source within the electronic device 102 to a rechargeable power source disposed within a coupled sensor module 104. For example, as described in further detail below with respect to FIG. 2 and FIG. 3, each sensor module 104 may include a rechargeable battery such that, when the sensor module 104 is disposed within the interface 114, the battery may be recharged via a power source disposed within the electronic device 102.

The sensor modules 104 may include one or more sensors such as motion sensors (e.g., accelerometers, gyroscopes, pressure sensors, etc.), one or more biometric sensors (e.g., fingerprint, face recognition, iris recognition, retina, etc.), one or more personal monitoring sensors that can sense physiological conditions (e.g., heart rate, temperature, blood glucose, etc.), one or more tracking sensors, or any combination thereof.

In a particular embodiment, the electronic device 102 may utilize the functionality(ies) of the sensor module 104 when disposed within the electronic device 102 (e.g., docked). The sensor modules 104 may be associated with a wearable device (of a user) or may be attached or coupled to any device or an object. The one or more sensor modules 104 may be wirelessly coupled to the electronic device 102 via a wireless link.

During operation, the sensor modules 104 are disposed or stored within the electronic device 102 until a user decides to deploy and use one or more of them. The user removes/detaches the sensor module 104 from the electronic device 102 and attaches or couples the sensor modules 104 to a wearable device or another device or object to be sensed. When deployed, the sensor module 104 performs its sensing and measuring functions, generates sensor data, and communicates its sensor data to the electronic device 102 while deployed (remote from the electronic device 102). The sensor data may be communicated to the electronic device 102 via a wireless link. In another embodiment, the deployed sensor module 104 stores its sensor data in a respective memory within the module and communicates the sensor data to the electronic device 102 when the sensor module 104 is inserted into the interface 114 of the electronic device 102. Once inserted, the sensor data is downloaded from the module 104 via a physical (wired) connection to the electronic device 102. Alternatively, once inserted, the sensor data may be downloaded from the module 104 via a wireless connection to the electronic device 102. Thereafter, the sensor data may be processed by the electronic device 102.

In another embodiment, the electronic device 102 may transmit the sensor data to a server-type processing device (not shown) for processing and/or storage.

Accordingly, the electronic device 102 functions or acts as a host/hub for the sensor modules 104 when they are not in use. This provides portability for the system 100 and maintains, stores and recharges the sensor modules 104 when not in use.

Figure 2:
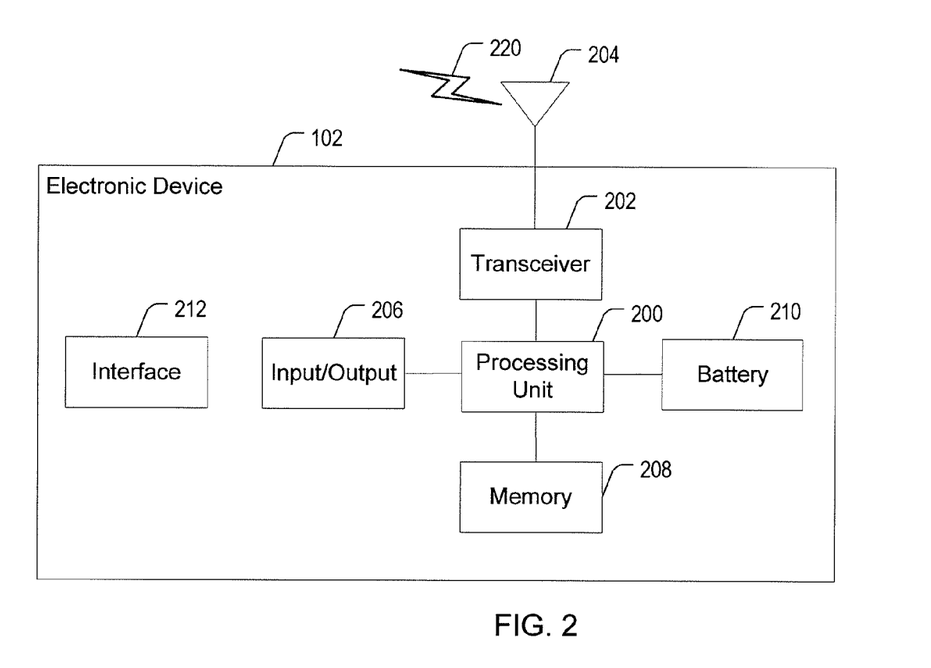
FIG. 2 illustrates an overall block diagram of an example electronic device in accordance with disclosed embodiments.

FIG. 2 illustrates an overall block diagram of one example of the electronic device 102. The electronic device 102 includes a processor 200, a transceiver 202, an antenna element 204, one or more input/output devices 206 (e.g., speaker/microphone, keypad, display/touchpad), memory 208, a power source (e.g., battery) 210 and an interface 212. As will be appreciated, the electronic device 102 may include one or more other components, devices, or functionalities (not shown), or may include fewer or more of the foregoing described elements.

The processor 200 may be a general purpose, special purpose or digital signal processor, and may be a plurality of processors or combination of such processors. The processor 200 includes functionality to perform signal coding, data processing, power control, input/output processing, and/or any other functionality enabling the electronic device 102 to operate in the system 100 for its intended purposes. The processor 200 is coupled to the transceiver 202 which is coupled to the antenna element 204. It will be understood that the processor 200 and the transceiver 202 may be separate components or integrated together. Similarly, the antenna element 204 may be a single element or a number of elements (multiple antennas or elements). The transceiver 202 is configured to transmit and receive electrical signals (carrying data) via the antenna 204. The electronic device 102 communicates with one or more other wireless devices over one or more air interfaces 220 using wireless communication links. The air interfaces 220 may utilize any suitable radio access technology.

The processor 200 is coupled to the one or more input/output devices 206 (including ports or busses) operable for inputting/outputting user data. In addition, the processor 200 is coupled to memory 208 operable for storing and retrieving data. Any suitable type of memory storage device may be included, such as random-access memory (RAM), read-only memory (ROM), hard disk, subscriber identity module (SIM) card, a memory stick, a secure digital (SD) memory card, and the like.

The processor 200 is coupled to the power source (e.g., battery) 210 that is operable for providing power to the electronic device 102. In a particular embodiment, the battery 210 is a rechargeable power source that can be charged by connecting the electronic device 102 to a stationary power source, such as using a charging unit connected to an AC outlet. Alternatively, the battery 210 may be configured to be wirelessly recharged.

The interface 212 is configured for connection to a corresponding interface of the sensor modules 104. This interface 212 provides electrical connection(s) to a power source and memory disposed within the sensor modules 104 facilitating power transfer and data communications between the electronic device 102 and the sensor modules 104 (when the sensor module 104 is connected to the interface 212).

Figure 3:
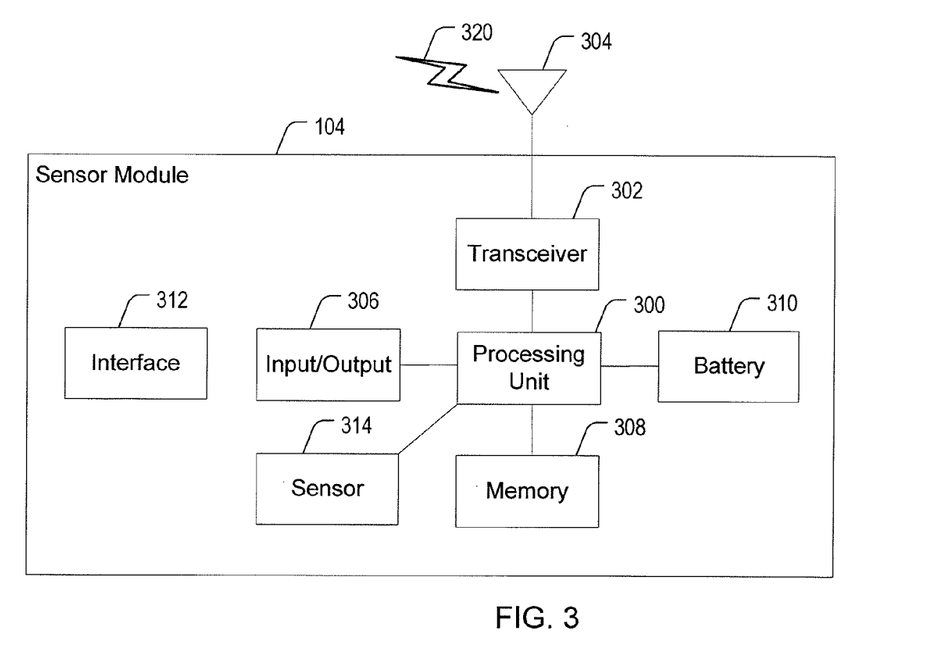
FIG. 3 illustrates an overall block diagram of an example sensor module in accordance with disclosed embodiments.

FIG. 3 illustrates an overall block diagram of an example sensor module 104. The sensor module 104 includes a processor 300, a transceiver 302, an antenna element 304, one or more input/output devices 306, memory 308, a power source (e.g., battery) 310, an interface 312 and one or more sensors 314.

As will be appreciated, the sensor module 104 may include one or more other components, devices, or functionalities (not shown). It will be understood that the sensor module 104 may include fewer or more of the foregoing described elements.

The processor 300 may be a general purpose, special purpose or digital signal processor, and may be a plurality of processors or combination of such processors. The processor 300 includes functionality to perform signal coding, data processing, power control, input/output processing, and/or any other functionality enabling the sensor module 104 to operate in the system 100. The processor 300 is coupled to the transceiver 302 which is coupled to the antenna element 304. It will be understood that the processor 300 and the transceiver 302 may be separate components or integrated together. Similarly, the antenna element 304 may be a single element or a number of elements (multiple antennas or elements). The transceiver 302 is configured to transmit and receive electrical signals (carrying data) via the antenna 304.

The processor 300 is coupled to the one or more input/output devices 306 (including ports or busses) operable for inputting/outputting sensor data. In addition, the processor 300 is coupled to memory 308 operable for storing and retrieving data. Any suitable type of memory storage device may be included, such as random-access memory (RAM), read-only memory (ROM), and the like.

The processor 300 is coupled to the power source 310 (e.g., battery) operable for providing power to the sensor module 104. In one embodiment, the battery 310 is a rechargeable battery (or other rechargeable power source) that receives power for recharging when the module 104 is connected to the electronic device 102. For example, the interface 312 of the sensor module 104 is configured for connection to a corresponding interface 212 on the electronic device 102. When connected, the interfaces 212, 312 provide electrical connection(s) therebetween to facilitate power transfer and data communications between the electronic device 102 and the sensor module 104 (when the interface 312 of the sensor module 104 is connected to the interface 212).

The processor 300 is coupled to the one or more sensors 314 operable for performing sensing and/or measuring functions and generating sensor data. The sensor data may be communicated to the electronic device 102 over one or more air interfaces 320 using wireless communication links. The air interfaces 320 may utilize any suitable radio access technology. The sensor data may be wirelessly communicated to the electronic device 102 without first being stored in the memory 308. Alternatively, the sensor data may be stored in the memory 308 prior to being wirelessly communicated to the electronic device 102. In another embodiment, the sensor data may be stored in the memory 308 and communicated to the electronic device 102 when the sensor module 104 is inserted into the interface 114 of the electronic device 102. Thereafter, the sensor data may be processed by the electronic device 102.

The re-charging of the sensor module battery 310 may be configurable by a user of the electronic device 102. For example, the user may choose to charge the sensor battery 310 only when the battery 210 of the electronic device 102 is being charged. Alternatively, the sensor battery 310 may be used to continuously supply power to the electronic device 102 (for operation and/or recharging) while the sensor module 104 is attached to the electronic device 102.

Figure 4:
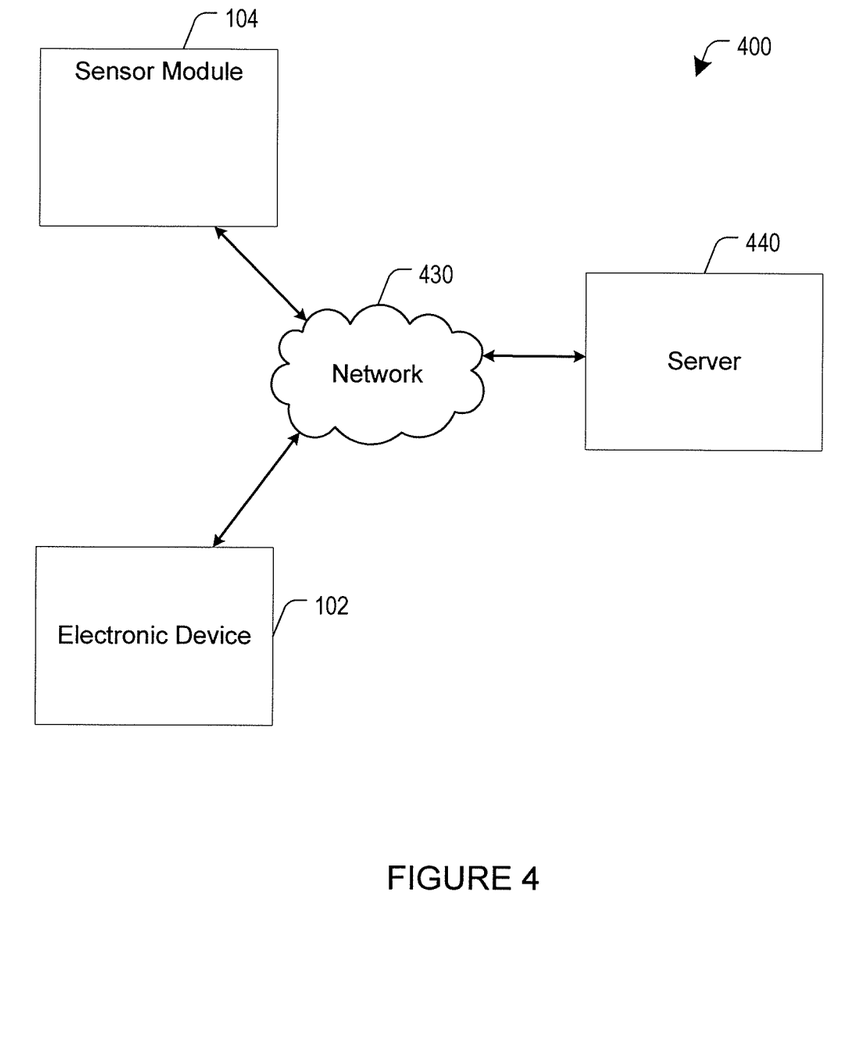
FIG. 4 illustrates a system for obtaining sensor data from one or more removable sensor modules in accordance with disclosed embodiments.

FIG. 4 illustrates a system 400 for obtaining sensor data from the sensor module 104. The system 400 includes the electronic device 102, the sensor module 104, a communications network 430 and a server 440. As will be appreciated, the sensor module 104 and/or the electronic device 102 may be coupled to other devices (such as the server 440) via the communications network 430. In one embodiment, the electronic device 102 may receive aggregate data collected by the sensor module 104 (received from the sensor module either wirelessly or when coupled to the electronic device).

In one embodiment, if certain calculations that are more processor intensive are needed or desired, these may be performed within the electronic device 102 or the server 440. This allows the sensor module 104 to utilize a low power processor and reduce power consumption. The sensor module 104 may also be coupled to the server 440 either directly through the network 430, or through the electronic device 102 via the network 430, to which the sensor module 104 is coupled.

The communications network 430 may be implemented by any medium or mechanism that provides for the exchange of data between various computing devices. Examples of such a network include a Local Area Network (LAN), Wide Area Network (WAN), Ethernet or the Internet, or one or more terrestrial, satellite, or wireless links. The network 430 may include a combination of networks such as those described.

Figure 5:
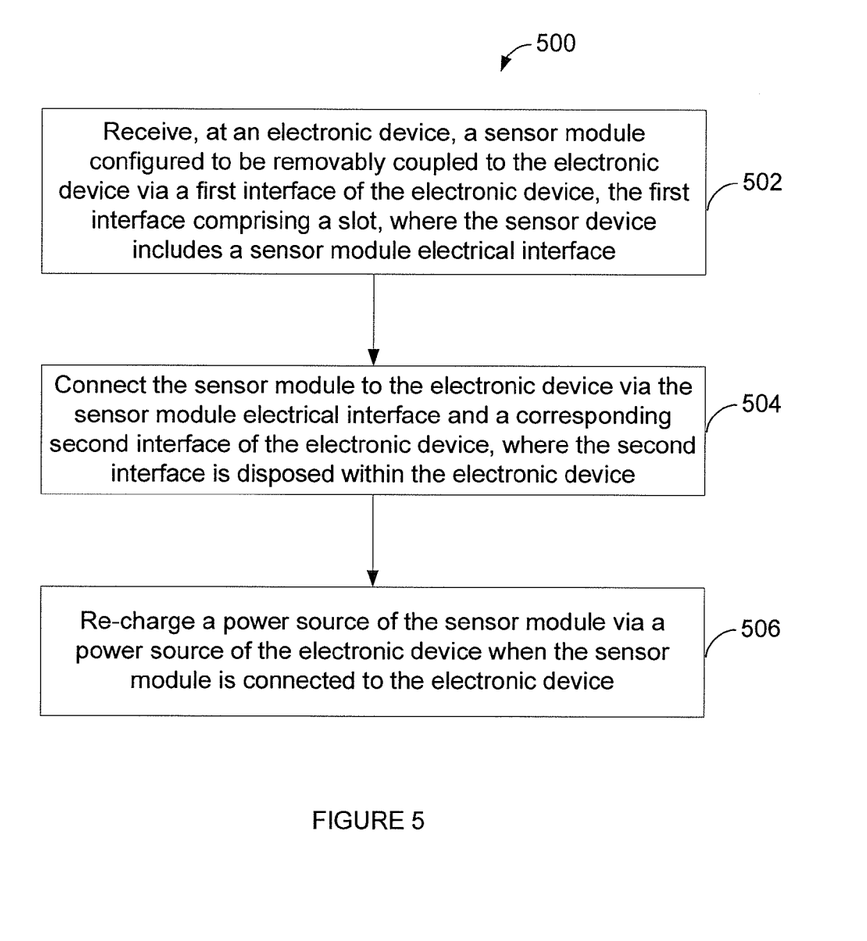
FIG. 5 illustrates a flow diagram illustrating a method of storing one or more removable sensor modules at an electronic device according to disclosed embodiments.

Now turning to FIG. 5, there is illustrated a flow diagram of a method 500 for storing the removable sensor module 104 at the electronic device 102. The method includes receiving, at the electronic device 102, the sensor module 104 via a first interface 114 of the electronic device 102 (step 502). This couples the interface 312 of the sensor module 104 with the interface 212 of the electronic device 102 (step 504). Power from the power source 310 of the sensor module 104 is supplied to the power source 210 of the electronic device 102 (step 506). This provides a recharging function for the power source 210 in the sensor module 104.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A wireless electronic device, comprising:
   a sensor module disposed within and removably coupled to the wireless electronic device, wherein the sensor module comprises:
      a sensor module interface;
      at least one sensor to collect sensor data; and
      a memory to store the sensor data;
   a first interface configured to receive the sensor module; and
   a second interface disposed within the wireless electronic device and configured to electrically connect to the sensor module interface when the sensor module is received via the first interface;

wherein the wireless electronic device is configured to reprogram a functionality of the sensor module when the sensor module is connected to the wireless electronic device such that the functionality is changed after the sensor module is detached from the wireless electronic, wherein the functionality change comprises at least one of a reprogramming via a wireless link with the wireless electronic device of a rate of data acquisition by the at least one sensor or a number of sensors used by the sensor module.

2. The wireless electronic device in accordance with claim 1, wherein the sensor module interface facilitates access to the memory when the sensor module is connected to the wireless electronic device via the second interface.

3. The wireless electronic device in accordance with claim 2, wherein the wireless electronic device is configured to change an operating characteristic of the sensor module when the sensor module is connected to the wireless electronic device.

4. The wireless electronic device in accordance with claim 1, wherein the sensor module further comprises:
a sensor module power source configured to provide power to the sensor module.

5. The wireless electronic device in accordance with claim 4, further comprising:
an electronic device power source configured to provide power to the wireless electronic device, wherein the electronic device power source is configured to recharge the sensor module power source when the sensor module is connected to the wireless electronic device.

6. The wireless electronic device in accordance with claim 4, wherein the sensor module power source is further configured to provide power to the wireless electronic device when the sensor module is connected to the wireless electronic device.

7. The wireless electronic device in accordance with claim 1, wherein the wireless electronic device is configured to use sensor functionalities of the sensor module when the sensor module is connected to the wireless electronic device.

8. The wireless electronic device in accordance with claim 1, wherein sensor functionalities are shared between the wireless electronic device and the sensor module when the sensor module is connected to the wireless electronic device.

9. The wireless electronic device in accordance with claim 1, wherein the functionality comprises the rate at which data is acquired by the sensor module.

10. The wireless electronic device in accordance with claim 1, wherein when the sensor module further comprises a plurality of sensors, the electronic device is configured to reprogram the sensor module to collect data from at least a portion of the plurality of sensors but not all of the plurality of sensors.

11. The wireless electronic device in accordance with claim 1, wherein the sensor module further comprises:
a sensor module wireless interface configured to wirelessly couple the sensor module to a corresponding wireless interface of the wireless electronic device;
wherein the sensor module wireless interface provides access to the memory by the wireless electronic device when the sensor module is wirelessly connected to the wireless electronic device via the corresponding wireless interface.

12. The wireless electronic device in accordance with claim 11, wherein the sensor module further comprises:
a sensor module power source configured to provide power to the sensor module.

13. The wireless electronic device in accordance with claim 12, further comprising:
an electronic device power source configured to provide power to the wireless electronic device, wherein the electronic device power source is configured to recharge the sensor module power source when the sensor module is connected, via the sensor module interface.

14. The wireless electronic device in accordance with claim 12, wherein the sensor module power source is further configured to provide power to the wireless electronic device when the sensor module is connected, via the sensor module interface, to the wireless electronic device via the second interface.

15. The wireless electronic device in accordance with claim 12, wherein the wireless electronic device is configured to change an operating characteristic of the sensor module when the sensor module is wirelessly connected to the wireless electronic device.

16. The wireless electronic device in accordance with claim 15, wherein the operating characteristic comprises a rate at which data is acquired by the sensor module.

17. The wireless electronic device in accordance with claim 15, wherein when the sensor module further comprises a plurality of sensors, the electronic device is configured to reprogram the sensor module to collect data from at least a portion of the plurality of sensors but not all of the plurality of sensors.

18. A wireless electronic device to provide sensor functionality, the wireless electronic device comprising:
a first interface comprising a slot configured to receive a removably coupled sensor module; and
a second interface disposed within the wireless electronic device and configured for electrical connection to a corresponding interface on the sensor module when the sensor module is connected to the wireless electronic device via the first interface;
wherein the sensor module comprises:
at least one sensor configured to collect sensor data;
a memory configured to store the sensor data; and
a sensor module electrical interface that provides access to the memory when the sensor module is connected to the wireless electronic device through the second interface,
wherein the wireless electronic device is configured to reprogram a functionality of the sensor module when the sensor module is connected to the wireless electronic device such that the functionality is changed after the sensor module is detached from the wireless electronic device, and wherein the functionality change comprises at least one of a reprogramming via a wireless link with the wireless electronic device of a rate of data acquisition by the at least one sensor or a number of sensors used by the sensor module.

19. The wireless electronic device according to claim 18, further comprising:
a wireless interface configured to wirelessly couple the wireless electronic device to the sensor module via a corresponding wireless interface of the sensor module;
wherein the wireless interface of the wireless electronic device provides access by the wireless electronic device to sensor data generated by the sensor module when the sensor module is detached from the wireless electronic device and when the wireless electronic device is coupled to the sensor module via the corresponding wireless interface.

20. The wireless electronic device in accordance with claim 19, further comprising:
a wireless electronic device power source configured to provide power to the wireless electronic device, wherein the wireless electronic device power source is configured to re-charge a sensor module power source when the sensor module is electrically connected to the wireless electronic device via the second interface.

21. The wireless electronic device in accordance with claim 19, wherein the wireless electronic device is configured to receive power from the sensor module via a sensor module power source when the sensor module is electrically connected to the wireless electronic device via the second interface.

22. A method of storing one or more removable sensor modules at a wireless electronic device, the method comprising:
at the wireless electronic device:
receiving a sensor module configured to be removably coupled to the electronic device via a first interface comprising a slot of the electronic device, the sensor module including a sensor module electrical interface;
connecting the sensor module to the electronic device via the sensor module electrical interface and a corresponding second interface of the electronic device, the second interface disposed within the electronic device; and
reprogramming a functionality of the sensor module when the sensor module is connected to the wireless electronic device such that the functionality is changed after the sensor module is detached from the wireless electronic device, wherein the functionality change comprises at least one of a reprogramming via a wireless link with the wireless electronic device of a rate of data acquisition by the sensor module or a number of sensors used by the sensor module.

23. The method in accordance with claim 22, further comprising accessing sensor data stored in the sensor module when the sensor module is connected to the electronic device.

24. The method in accordance with claim 23, further comprising:
re-charging a sensor module power source via a power source of the electronic device when the sensor module is connected to the electronic device.

25. The method in accordance with claim 24, further comprising providing power to the electronic device from the sensor module when the sensor module is connected to the electronic device.

26. A sensor module comprising:
a sensor module wireless interface configured to wirelessly couple the sensor module to a corresponding wireless interface of a wireless electronic device;
a sensor module electrical interface configured to electrically couple the sensor module to a corresponding electrical interface of the wireless electronic device, wherein the sensor module is reprogrammable to change a functionality of the sensor module, when the sensor module is connected to the wireless electronic device;
at least one sensor configured to collect sensor data; and
a sensor module power source configured to provide power to the sensor module;
wherein the sensor module wireless interface provides access to the sensor data by the wireless electronic device when the sensor module is wirelessly connected to the wireless electronic device via the corresponding wireless interface and the functionality of the sensor module is reprogrammed when the sensor module is connected to the wireless electronic device such that the functionality is changed after the sensor module is detached from the wireless electronic device, and wherein the functionality change comprises at least one of a reprogramming via a wireless link with the wireless electronic device of a rate of data acquisition by the at least one sensor or a number of sensors used by the sensor module.

27. The sensor module in accordance with claim 26, further comprising a memory configured to store the sensor data.

28. The sensor module in accordance with claim 27, wherein the sensor module electrical interface facilitates access to the sensor data by the wireless electronic device when the sensor module is electrically connected to the wireless electronic device via the corresponding electrical interface.

29. The sensor module in accordance with claim 28, wherein the sensor module power source is configured to provide power to the wireless electronic device when the sensor module is electrically connected to the wireless electronic device.

* * * * *

UNITED STATES PATENT AND TRADEMARK OFFICE
CERTIFICATE OF CORRECTION

PATENT NO. : 9,942,625 B2  
APPLICATION NO. : 14/145549  
DATED : April 10, 2018  
INVENTOR(S) : Jorge Fabrega Sanchez Page 1 of 1

It is certified that error appears in the above-identified patent and that said Letters Patent is hereby corrected as shown below:

On the Title Page

In item (71), in "Applicant", in Column 1, Line 1, after "Technologies", insert --,--

In the Specification

In Column 3, Line 15, delete "recharged" and insert --re-charged-- therefor

Signed and Sealed this
Fourth Day of June, 2019

Andrei Iancu
*Director of the United States Patent and Trademark Office*